July 18, 1950      G. V. SLOTTMAN ET AL      2,515,670
MANUFACTURE OF OPEN-HEARTH STEEL Filed Oct. 22, 1946      4 Sheets-Sheet 1

INVENTORS
GEORGE V. SLOTTMAN &
PHILIP M. HULME
BY
ATTORNEYS

July 18, 1950     G. V. SLOTTMAN ET AL     2,515,670
MANUFACTURE OF OPEN-HEARTH STEEL
Filed Oct. 22, 1946     4 Sheets-Sheet 4
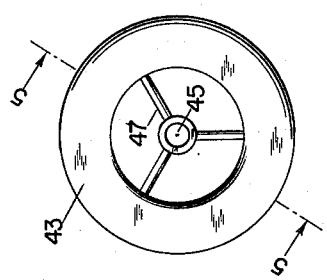
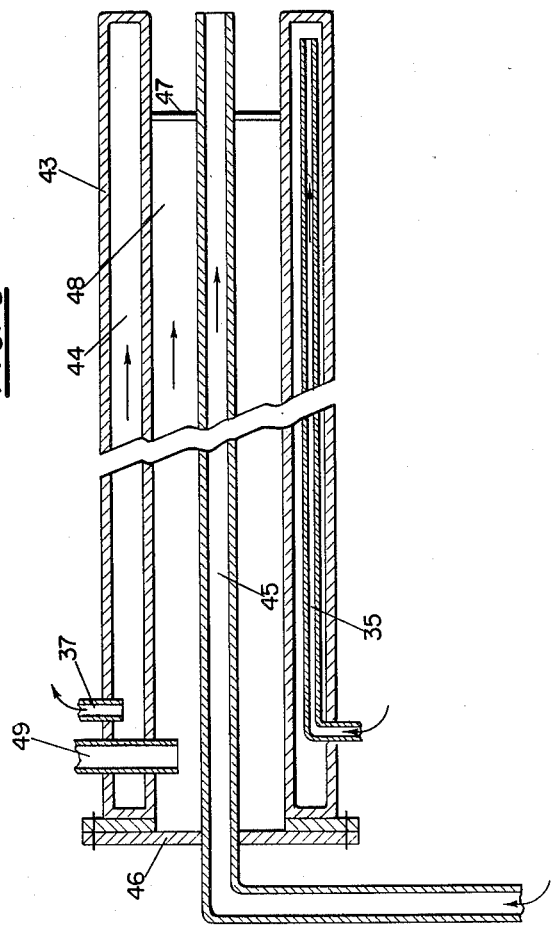
INVENTORS
GEORGE V. SLOTTMAN &
PHILIP M. HULME
BY
ATTORNEYS

UNITED STATES PATENT OFFICE 2,515,670

MANUFACTURE OF OPEN-HEARTH STEEL

George V. Slottman, New York, N. Y., and Philip M. Hulme, Stamford, Conn., assignors to Air Reduction Company, Incorporated, New York, N. Y., a corporation of New York Application October 22, 1946, Serial No. 704,936

4 Claims. (Cl. 75—43)

This invention relates to the manufacture of steel in open hearth furnaces and particularly to improvements in the method which are applicable in both basic and acid practice to effect substantial economies in the operation.

In the typical operation, an open hearth furnace, after each heat, is repaired by fettling, and during the period required for repairs, the temperature of the furnace brickwork cools to about 2000° to 2500° F. Thereafter, a charge of solid material, principally scrap steel, is introduced. Where high hot metal-scrap ratios are used, some ore is charged with the scrap. If low hot metal-scrap ratios are used, no ore is charged. Limestone is introduced beneath the scrap, the proportion depending upon whether basic or acid practice is followed. The charging period varies, and after the initial charge, the furnace is fired and the charge is melted by combustion of fuel with preheated air introduced through the checkerwork which has been heated by outgoing products of combustion. When the charge has been heated sufficiently to at least partly melt it, molten pig iron is usually added. The heating is continued. At this period, the partially molten charge, in which the unmelted scrap may be submerged, presents a relatively smooth surface covered by a thin layer of silicate slag, and heat is absorbed slowly because of the relatively small surface area which is exposed to the flame.

In basic practice, when considerable limestone is immersed in the molten metal, the limestone calcines, evolving carbon dioxide which reacts with carbon in the bath to form carbon monoxide. The latter rises through the slag cover and escapes. In this so-called "lime boil," some of the metal is thrown upwardly into the flame, thus facilitating the transfer of heat to the metal. Thereafter the lime rises through the metal and combines with the silicate slag to form a basic slag.

If the temperature is not maintained at the required point, the slag may become so viscous that gas bubbles cannot escape. A foaming slag results and acts as an insulating cover to decrease the rate of heat transfer to the molten metal. Considerable difficulty is often experienced in eliminating a foaming slag, and in maintaining the desired temperature.

When all of the scrap has been melted and the limestone has been calcined and any ore which has been charged has reacted with the bath, the latter reaches an equilibrium point at a given carbon content. The operator then takes a sample and determines the average concentration of the various elements therein. Usually the carbon is too high and it is reduced by adding ore through the charging doors. The reaction of ore with the bath is strongly endothermic. Moreover, the ore is cold and must be raised to the temperature of the bath. Hence the temperature of the bath falls, and it is necessary again to raise the temperature by heat transfer from the burning fuel.

Sometimes the carbon becomes too low and it is necessary to raise it by addition of hot metal. Any excess of carbon thus introduced must be eliminated again by addition of ore. Finally, when the composition is that desired, the metal may be at a temperature too low for pouring. At this point, the bath is inactive, and heat transfer is slow. Hence the operation is prolonged by the necessity of raising the temperature of the bath to the required point.

The foregoing outline is intended to indicate merely the major operations and difficulties which are experienced in the production of open hearth steel. Many variations of the practice are followed, depending upon the particular situations which may arise and the knowledge of the operator. He must be sufficiently skilled in adjusting the conditions so that eventually the metal in the bath is brought to the required composition at a temperature which permits casting in the ingot molds without an excess of waste material. The operator is, however, subject to a fundamental limitation. Modification of the flame, and particularly of the rate at which heat is transferred to the bath, is not controllable to any significant degree. Hence the operator is obliged to wait until the available heat penetrates the bath and the latter is brought to its final desired condition.

These and other difficulties, though they have existed in the practice for many years of commercial production, are obstacles to the economical operation of the open hearth method and, especially in an era of high labor costs, are unsatisfactory and result in excessive production costs. A procedure, therefore, which will materially reduce the time required to complete a heat with more efficient control throughout the heat will permit substantial economies in open hearth practice.

It is the object of the present invention to provide an improved procedure for the production of steel by the open hearth method which effects substantial economies in the operation, particularly in the time required to complete a given heat, producing thereby metal of satisfactory and often of improved quality.

Another object of the invention is the provision of an open hearth operation wherein the application of heat to the bath is more readily controlled to produce desired effects in the minimum time.

A further object of the invention is the provision of a method which permits the burning of more fuel in a given time in the furnace to thereby accelerate the application of the heat units supplied under conditions which permit economical application of the heat and reduction of the time required to complete the operation.

Another object of the invention is the provision of an improved procedure for reduction of carbon in the metal with coincident increase of the temperature of the bath.

The above objects of the invention are attained by melting the initial charge including scrap metal by directing thereon a flame produced by combustion of a mixture of fuel and a gas for primary combustion containing more than 45% of oxygen, while introducing air for secondary combustion so that an intense and relatively short flame is produced until the charge is melted sufficiently to have a substantially level molten surface, and then substantially reducing the concentration of oxygen in the gas supplied for primary combustion and adding oxygen to the air supplied for secondary combustion to increase the oxygen content thereof, whereby a relatively longer and relatively less intense flame which is more effective in heating the furnace to the desired extent is produced. The heating with the relatively longer and relatively less intense flame preferably is continued until the roof over the hearth reaches a temperature of about 2900° F. The amount of fuel supplied for combustion then is reduced and the combustion of the fuel with air is continued.

Other objects and advantages of the invention will be better understood by reference to the following description and the accompanying drawings, in which:

Fig. 5 is a longitudinal section on the line 5—5 of Fig. 6, showing one of the burners employed in firing the furnace; and Fig. 6 is an end elevation of the burner as shown in Fig. 5.

Figure 1:
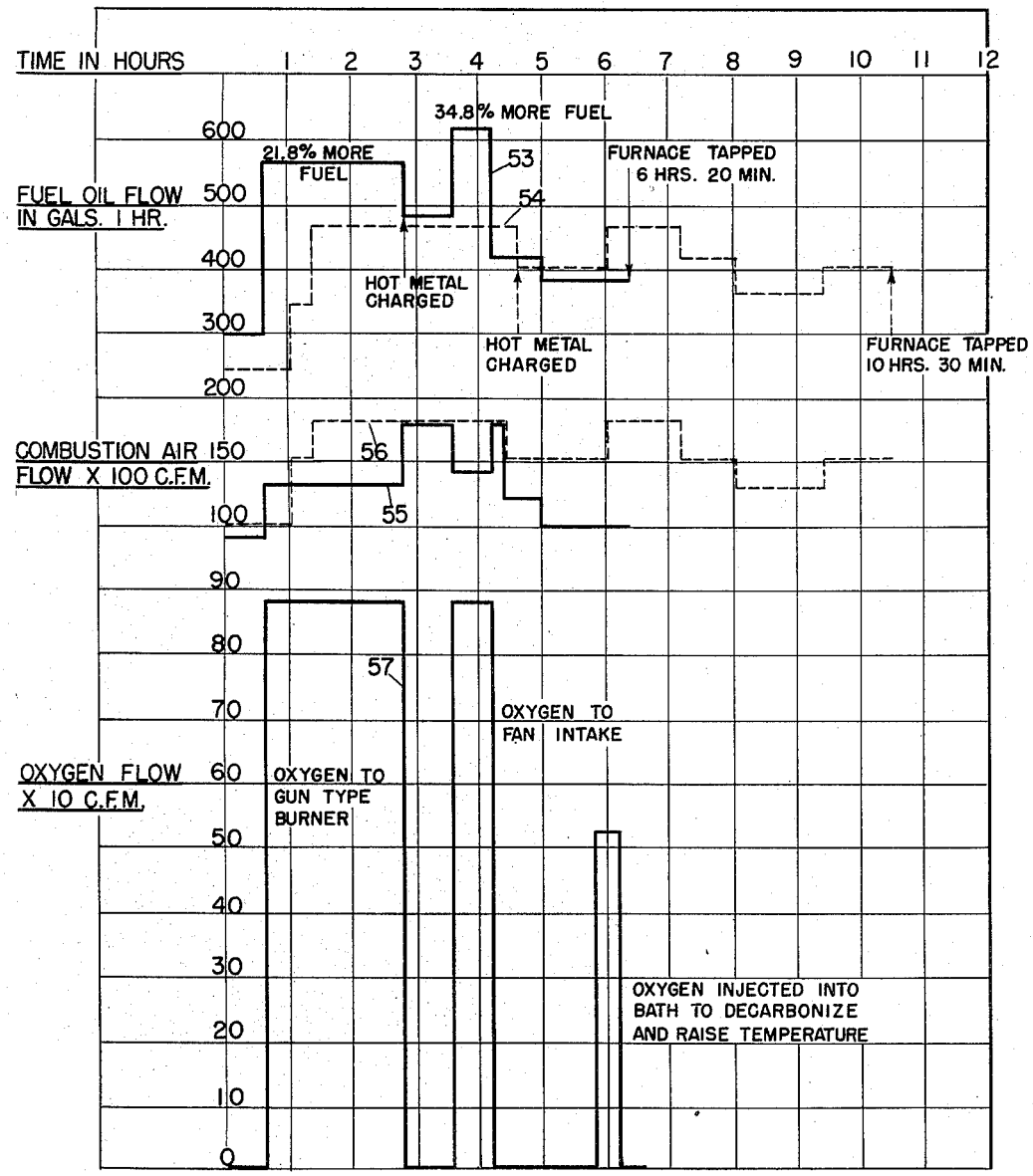
Figs. 1 and 2 are comparative charts contrasting a typical open hearth operation as heretofore conducted with a similar operation under the improved procedure with respect to the critical factors and the time consumed, the dotted lines indicating previous practice, and the full lines, improved practice.

In the practice of the present invention, the usual open hearth furnace provided with regenerators for heating the incoming air for secondary combustion may be used. Preheated air is supplied continuously through the usual ports, and during part of the operation the air may be utilized for the combustion of the fuel in accordance with common practice. Any suitable fuel may be used, such as petroleum oil, fuel gas, pulverized coal or the like. Petroleum oil is preferred, since the supply thereof in relation to the oxidizing gas may be more readily controlled.

The invention depends upon the use, at certain stages of the operation, of oxygen and of oxygen-enriched air as combustion agents with the fuel. Thus, during the melting stage when scrap steel with or without ore or pig iron is melted in the hearth, oxygen for primary combustion is introduced with the fuel to form an intense relatively short flame which is directed upon the scrap. The melting of the scrap is accomplished rapidly and effectively because the use of oxygen for primary combustion materially augments the quantity of fuel which can be consumed during a given time, increases the temperature of the flame, and produces an intense, relatively short flame which is most suitable for rapidly transferring heat to the solid charge by direct contact. The increase in heat units supplied during a given time and the characteristics of the flame produced makes possible the rapid absorption of heat by the charge which is quickly reduced to a molten condition so that the time required for this stage of the operation is materially less than that normally experienced in the common practice in which the fuel is burned only with preheated air.

The oxygen used may be oxygen of commercial purity such as that obtainable by the liquefaction and rectification of air. While high purity, for example up to 99% is desirable, it is not essential. Gaseous mixtures containing from 45% to 99% oxygen are usable for the purpose of the invention. Maximum efficiency is obtainable, however, with the higher purities.

After the initial melting period, when molten pig iron is usually added, the bath is not adapted to absorb heat readily from the type of flame which is most effective in melting. The bath is then relatively quiescent, with a smooth slag-covered surface, except during the lime boil in the basic process, during which molten metal is thrown upwardly from the bath by the rising gas. At this stage of the operation, therefore, the oxygen supplied for primary combustion is cut off and combustion is effected with preheated air supplied by the regenerators. The flame becomes less intense and is spread more evenly over the charge. The roof temperature rises accordingly, and much of the heat is transferred by radiation.

There is, however, a tendency for the temperature of the metal to drop, particularly after the addition of molten pig iron and while the lime rises to the surface and forms a slag with the silicate. The slag may become foamy, affording insulation against heat transfer. To avoid such a condition, oxygen in suitable proportions is diverted into the air intake and, by enriching the air, permits combustion of an increased quantity of fuel in unit time, and provides a less intense, relatively longer flame which is most effective in transferring heat by radiation to the bath. The fluidity of the slag will increase with the addition of heat units, permitting carbon monoxide to escape readily through the slag. The bath is thereby maintained at the proper temperature.

At this point, it is necessary to adjust the carbon content of the metal. Ore may be added for that purpose if desired, and the oxygen feed to the air inlet may be continued to maintain the required temperature. Preferably, however, the adjustment of the carbon is made by introducing oxygen through a suitable pipe immersed in the metal of the bath. The oxygen reacts preferentially with the carbon, although some of the iron may oxidize and join the slag. The introduction of oxygen not only quickly reduces the carbon to the required point, even as low as 0.02%, but since the reaction of the oxygen with carbon and with iron is exothermic, the temperature of the bath is raised, and no difficulty is met in maintaining a proper pouring temperature.

As will be observed, the temperature conditions of the bath are at all times under control of the operator who, by employing oxygen, or oxygen mixed with air, or air alone, and adjusting the fuel feed accordingly, may modify the nature of the flame and the quantity of heat units supplied in unit time in order to meet particular requirements as the heat progresses. This flexibility, which is not possible when air alone is employed as the combustion agent, permits better control of the procedure, more certainty of the desired results, and especially it reduces the time required to complete the heat. Thus, in a single furnace more heats can be completed in a given time with resulting economy of plant overhead and labor cost. It has been demonstrated that the cost of the oxygen used does not seriously affect the saving accomplished, so that the procedure is commercially economical and practicable.

Figure 3:
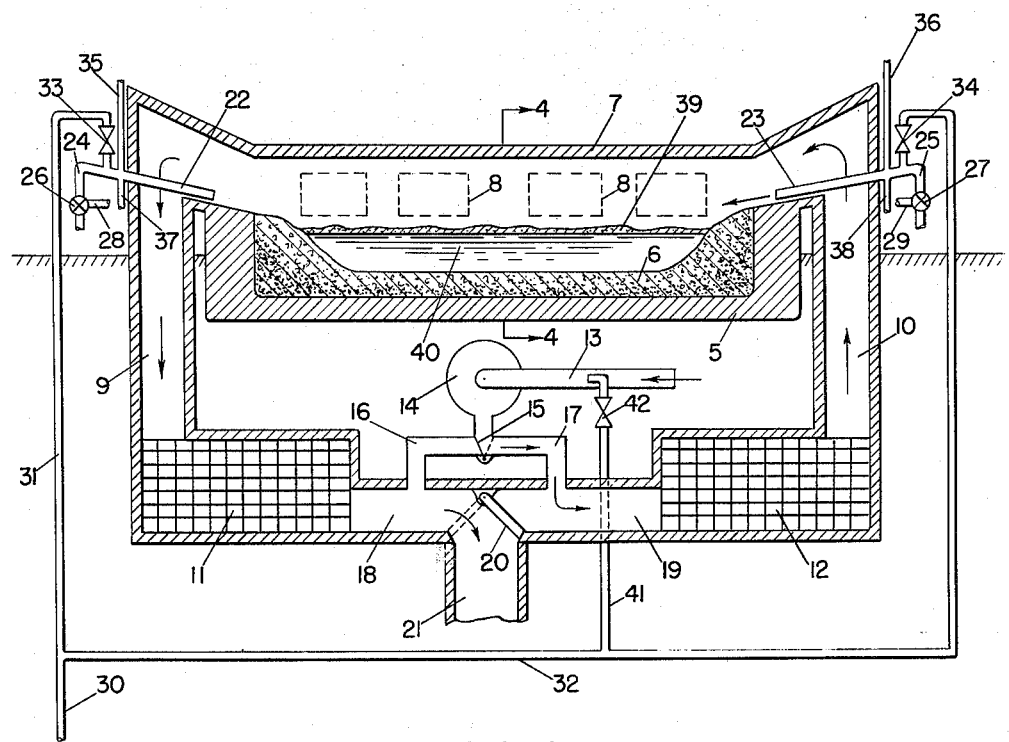
Fig. 3 is a diagrammatic illustration of an open hearth furnace, indicating the modifications necessary to permit the improved practice.
Figure 4:
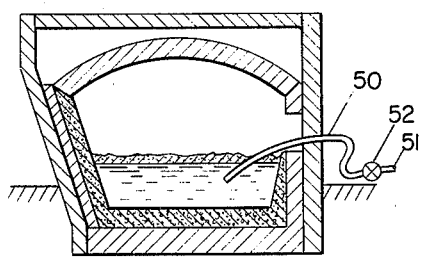
Fig. 4 is a section on the line 4—4 of Fig. 3, showing in addition means for introducing an oxidizing gas to the bath.

Referring to Figs. 3 and 4 of the drawing, 5 indicates an open hearth furnace having the usual hearth 6, roof 7 and charging doors 8. The furnace is provided with flues 9 and 10 communicating with checkerwork 11 and 12. Air for secondary combustion is introduced through an inlet pipe 13 and blower 14 and is directed, by manipulation of the valve 15, through either of the pipes 16 and 17 to flues 18 and 19 connected with the checkerwork. A valve 20 is adapted to be manipulated to direct the products of combustion into the outlet flue 21, which may be connected with a stack. As shown in Fig. 3, the air proceeds through the pipe 17 and flue 19 to the checkerwork 12 and thence through the flue 10 to the furnace, where it is utilized in burning fuel. The products of combustion escape through the flue 9 to the checkerwork 11 and thence through the flues 18 and 20. It is to be understood that in accordance with usual practice, reversal of direction of flow occurs at intervals.

In accordance with the present invention, burners 22 and 23 are provided at opposite ends of the furnace and are adapted to be supplied with fuel, preferably oil, through pipes 24 and 25 controlled by valves 26 and 27. Steam or air is usually supplied to atomize the fuel through branch pipes 28 and 29. Oxygen for primary combustion is supplied from a suitable source through a pipe 30 and is delivered by branches 31 and 32 to the respective burners 22 and 23, valves 33 and 34 being provided to control the supply of oxygen. The burners are cooled with water introduced and withdrawn through pipes 35, 36, 37 and 38. It will be noted that the burners 22 and 23 are directed so that the sharp, hard flames at high temperature play upon the bath and during the melting interval these flames play an important part in the reduction of the time required to reduce the scrap to a molten condition.

In order to modify the character of the flame when the melting is completed and a layer of slag 39 is formed upon the bath of molten metal 40, a branch pipe 41 controlled by a valve 42 is connected to the air inlet pipe 13 so that oxygen supplied through the pipe 32 may be diverted to and mingled with the air which, after passing through one of the regenerators, is delivered to the furnace to support secondary combustion of the fuel. At this point, the valves 33 and 34 are closed, and the fuel supplied by the burners 22 and 23 is burned with the preheated air enriched in oxygen. The oxygen enrichment of the air for secondary combustion may be modified as required to meet particular conditions, and whenever such enrichment is not required, the valve 42 is closed and the fuel is burned with preheated air. It is, of course, evident that only one of the burners 22 and 23 is in operation at any particular interval. Upon reversal of the flow of air and combustion products through the checkerwork, the fuel feed to the burner at the outlet end of the furnace is cut off.

In order that the nature of the burner may be clear, reference is made to Figs. 5 and 6, in which the details of the preferred construction are shown. It is to be understood that numerous modifications may be made. The burner comprises a shell 43 of cylindrical form having a water chamber 44 to which water is supplied through the pipe 35 and withdrawn through the pipe 37. A fuel pipe 45 extends through a head 46 and is supported by a spider 47. The fuel is thus directed into the furnace. Surrounding the fuel pipe 45 is a chamber 48 to which oxygen for primary combustion of the fuel is supplied through a pipe 49. As indicated in Fig. 3, suitable valves permit control of the fuel and oxygen feed and of the introduction of steam or air with the fuel to permit the production of a flame having the desired characteristics and particularly the acceleration of the introduction of heat units into the furnace during the initial melting period in order that the time required for melting may be materially reduced.

As shown in Fig. 4, a pipe 50 may be introduced through the charging door and directed beneath the bath of metal to introduce oxygen directly to the metal. The pipe 50 is connected to an oxygen supply pipe 51, and the flow of oxygen is controlled by a valve 52. This phase of the procedure involves decarbonizing of the iron, as hereinafter indicated, and the pipe 50 is not introduced until the decarbonizing stage of the operation is reached.

Figure 2:
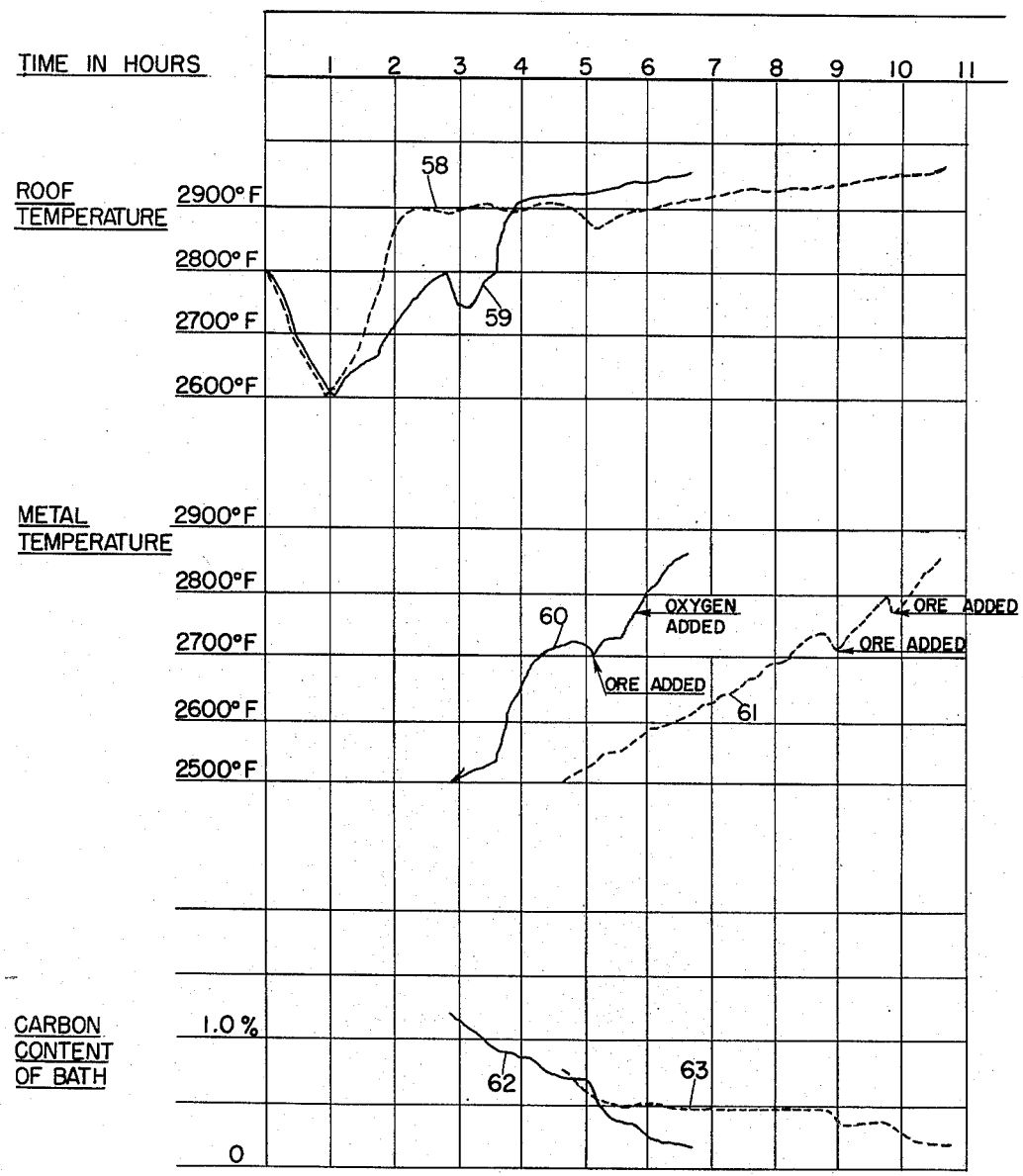

Referring to Figs. 1 and 2, the charts indicate various factors in the operation of a typical 200-ton open hearth furnace which may have hearth dimensions of approximately 40 feet long and 20 feet wide. Operation in accordance with the previously known procedure is indicated in dotted lines, and the improved procedure, in full lines. The various factors are plotted against the time required to complete the respective heats.

Thus, at the top of Fig. 1, the flow of fuel oil in gallons is plotted. During the initial operation of melting the charge, the improved practice as indicated in line 53 permits the consumption of 21.8% more fuel than is consumed in normal practice as shown in dotted line 54. The melting time is reduced to less than three hours, as compared with more than four and a half hours for normal operation. After the addition of melted pig iron, the improved method employs preheated air for a period, after which preheated air enriched with oxygen is supplied for another period to consume 34.8% more fuel. In each instance where an excess of fuel is employed, heat is introduced more rapidly for the purpose of maintaining the bath at the required temperature. The furnace is tapped at the end of six hours and thirty minutes, as compared with ten hours and thirty minutes under previous practice.

The consumption of air is indicated in the second graph of Fig. 1 by the line 55 and the dotted line 56, and the consumption of oxygen is shown in the third graph by the line 57. The latter clearly indicates how oxygen is employed in the burner and to enrich the air for the purpose of accelerating the completion of the heat. The final introduction of oxygen directly to the metal bath to decarbonize the metal is also indicated, although this step is not essential. Ore may be used, or a combination of ore and oxygen, to bring the carbon to the required point.

Referring to Fig. 2, it will be noted that in the standard practice the roof temperature rises rather rapidly after the initial melting period, as shown by the dotted line 58. Since there is a maximum safe temperature to which the silica bricks of the roof may be heated, it is desirable to maintain the temperature as low as possible until the period when radiation is most effective, and then to raise the temperature to the maximum practicable for as short a period as possible. This is accomplished by the method of the present application, as is clearly shown by the line 59 at the top of Fig. 2. The effect of rapid heat input is readily observed in the second graph of Fig. 2, which shows in line 60 the temperature gradient during the improved operation and, in a dotted line 61, the heat gradient in the standard practice. It clearly indicates the rise in temperature during the addition of oxygen at the end of the heat to decarbonize the metal. The third graph of Fig. 2 illustrates the rapid reduction of the carbon content during the operation, the line 62 indicating the new procedure, and the dotted line 63, the standard practice. Since the entire procedure is directed primarily to the manufacture of steel having the desired carbon content which requires reduction of the carbon initially present, it becomes immediately apparent from the graph that the new procedure affords a rapid and effective reduction of carbon throughout a major part of the procedure.

The invention, as hereinbefore indicated, depends primarily upon the control of the nature and temperature of the flame and of the quantity of heat introduced thereby in respect to the time of the operation and the particular condition of the bath. The amount of additional fuel consumed as shown by Fig. 1 is merely illustrative. More or less heat units can be provided as required by supplying oxygen, oxygen enriched air or air alone. With this control, the operator can effect the desired changes in the composition of the metal more readily, with more certainty, and in a shorter time than has been possible heretofore. A reduction of a heat by a matter of four hours is in itself a substantial advantage, since it obviously permits the production of more heats in the same furnace during any given period. The flexibility of control removes practically all of the uncertainty which has been characteristic of the operation of open hearth furnaces throughout the period of their use.

Various changes may be made in the details of procedure and in the apparatus as described, without departing from the invention or sacrificing the advantages thereof.

We claim:

1. The method of manufacturing open hearth steel which comprises melting the initial charge including scrap metal by directing thereon a flame produced by combustion of a mixture of fuel and a gas for primary combustion containing more than 45% of oxygen, while introducing air for secondary combustion containing a lower concentration of oxygen than the gas supplied for primary combustion, whereby an intense, relatively short flame is produced, and after the charge is melted sufficiently to have a substantially level molten surface, substantially reducing the concentration of the oxygen in the gas supplied for primary combustion and substantially increasing the concentration of the oxygen of the air supplied for secondary combustion to produce a relatively longer and relatively less intense flame.

2. The method of manufacturing open hearth steel as set forth in claim 1 in which the heating with the relatively longer, relatively less intense flame is continued until the roof over the hearth reaches a temperature of about 2900° F., and then reducing the amount of fuel for combustion and continuing the combustion of the fuel supplied with air.

3. The method of manufacturing open hearth steel as set forth in claim 1 in which after the charge is melted sufficiently to have a substantially level molten surface the oxygen supplied to the air for primary combustion is discontinued.

4. The method of manufacturing open hearth steel as set forth in claim 1 in which the air for secondary combustion is preheated.

GEORGE V. SLOTTMAN.
PHILIP M. HULME.

REFERENCES CITED

The following references are of record in the file of this patent:

UNITED STATES PATENTS

| Number | Name | Date |
|---|---|---|
| 1,484,465 | Billings | Feb. 19, 1924 |
| 1,513,735 | Bigge | Nov. 4, 1924 |
| 1,545,823 | Feild | July 14, 1925 |
| 1,659,869 | Gow | Feb. 21, 1928 |
| 1,718,732 | Danforth | June 25, 1929 |
| 1,792,021 | Loftus | Feb. 10, 1931 |
| 1,955,589 | Leahy | Apr. 17, 1934 |
| 2,039,087 | Kinzel | Apr. 28, 1936 |
| 2,182,498 | Longenecker | Dec. 5, 1939 |
| 2,362,085 | Morgan | Nov. 7, 1944 |
| 2,446,511 | Kerry et al. | Aug. 3, 1948 |

FOREIGN PATENTS

| Number | Country | Date |
|---|---|---|
| 560,736 | France | July 17, 1923 |
| 7,272 | Great Britain | of 1896 |
| 6,301 | Great Britain | of 1911 |
| 127,181 | Great Britain | May 29, 1919 |
| 252,267 | Italy | Mar. 7, 1927 |

OTHER REFERENCES

Pages 31–33 of Report of Investigation 2502, "The Use of Oxgen or Oxygenated Air in Metallurgical and Allied Processes," by F. W. Davis. Published by the Bureau of Mines, July 1923.

Certificate of Correction

July 18, 1950

Patent No. 2,515,670

GEORGE V. SLOTTMAN ET AL.

It is hereby certified that error appears in the printed specification of the above numbered patent requiring correction as follows:

Column 8, line 25, after the word "fuel" strike out "supplied" and insert the same after "fuel" in line 23, same column;

and that the said Letters Patent should be read as corrected above, so that the same may conform to the record of the case in the Patent Office.

Signed and sealed this 24th day of October, A. D. 1950.

[SEAL]

THOMAS F. MURPHY,
*Assistant Commissioner of Patents.*